United States Patent [19]
Badalich

[11] 3,759,487
[45] Sept. 18, 1973

[54] STACKED MIXED SLIDE GATE MECHANISM
[75] Inventor: Frank C. Badalich, Chicago, Ill.
[73] Assignee: Bell & Howell Company, Chicago, Ill.
[22] Filed: May 10, 1971
[21] Appl. No.: 141,619

[52] U.S. Cl. .................................. 353/104, 353/21
[51] Int. Cl. ............................................ G03b 23/00
[58] Field of Search .................. 353/104, 113, 116, 353/114, 95

[56] References Cited
UNITED STATES PATENTS
2,583,442  1/1952  Parlini et al. ....................... 353/104
2,260,660  10/1941  Darwin ............................. 353/104

Primary Examiner—Harry N. Haroian
Attorney—Griffin, Branigan & Kindness and William F. Pinsak

[57] ABSTRACT

A stacked mixed slide gate mechanism for use in a slide projector to allow the projector to move slides of varying thicknesses through the projection axis is described. The slides are stacked in a slide supply tray and received by a slide storage tray. The slides are "pressed" against the front of each tray by a spring-pressure pad arrangement. Located adjacent to the front of each tray is a moveable gate. In normal operation, the gate is spaced from the slide movement path by a predetermined amount sufficient to allow a "thin" slide to pass while preventing the next slide from passing. When a "thick" slide is to be moved, the moveable gate opens to a detent position. The gate becomes locked in this position and allows the thick slide to pass without the gate rubbing on the photographic surface of the slide. When the slide movement mechanism returns to pick up the next slide, it returns the gate to the "normal" or thin slide position.

12 Claims, 5 Drawing Figures

Inventor:
Frank C. Badalich
Griffin, Branigan & Kindness
By Attys

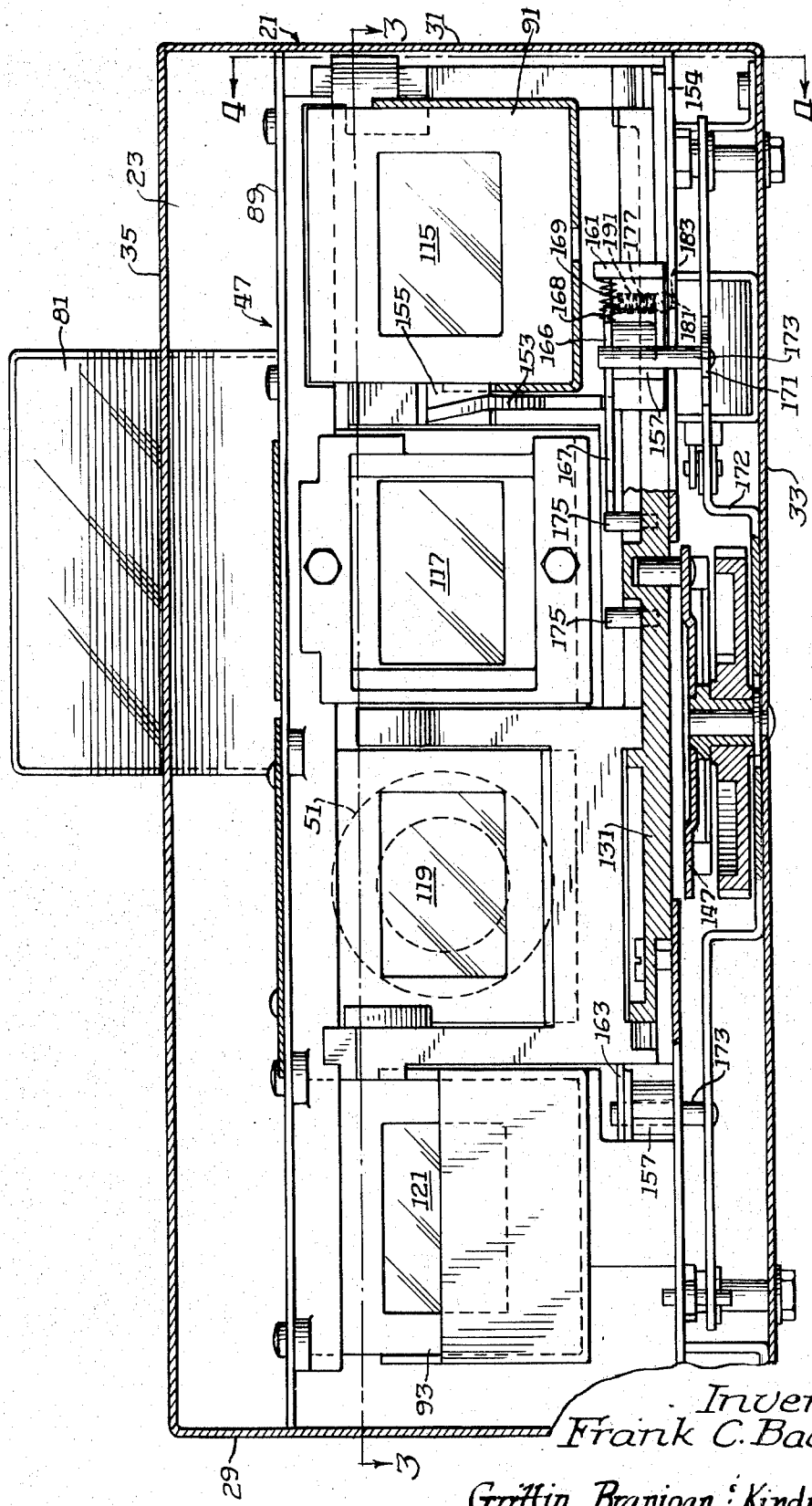

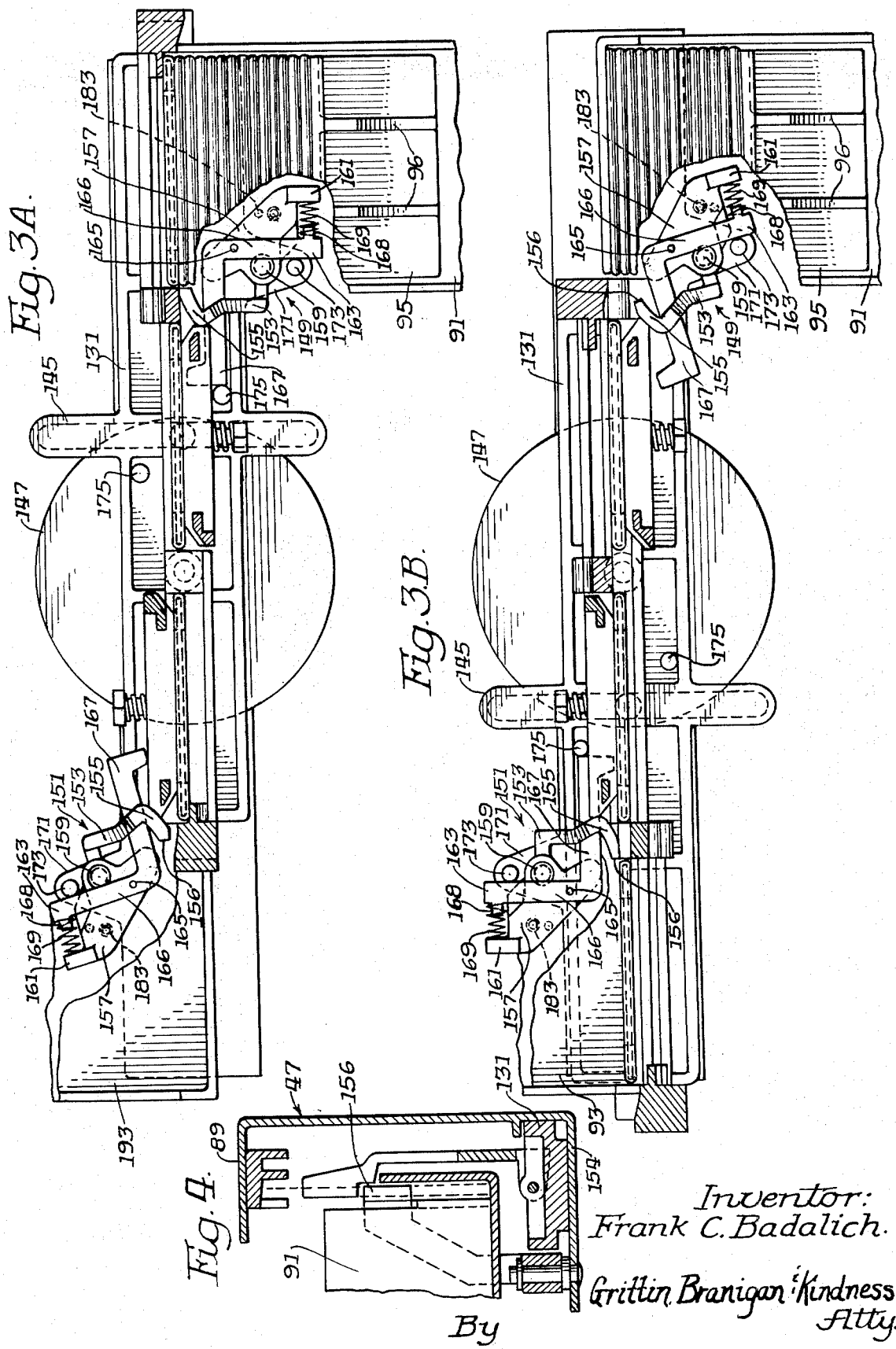

STACKED MIXED SLIDE GATE MECHANISM

BACKGROUND OF THE INVENTION

The present invention relates to slide projectors and more particularly to a stacked mixed slide gate mechanism for use in a slide projector to allow the projector to project slides of varying thickness.

Slide projectors including slide transfer mechanisms for moving slides from a slide supply tray through slide projection, and, in some cases, slide preview, stations to a slide storage tray are well known. While these mechanisms have found widespread use, many of them have one major problem. Specifically, many prior art slide transfer mechanisms become easily jammed because more than one slide moves at a time. That is, if a "thin" slide is located in a stack of normal thickness slides, the movement mechanism may move more than the one slide into the slide transfer path. In addition, even if the slides are of constant thickness, they may "stick" together or overlap due to moisture, static electricity or for other reasons. While a rather narrow opening formed around the slide movement path can be utilized to prevent more than one slide from moving if the sides are constant in thickness, such an opening is undesirable because slides often vary in thicknesses.

Therefore, it is an object of this invention to provide a mechanism suitable for use in slide projectors that prevents the movement of more than one slide at a time.

It is a further object of this invention to provide a stacked mixed slide gate mechanism suitable for use in projectors that move slides from one tray to another tray through projection and, in some cases, preview stations that prevents more than one slide leaving a tray at a time.

It is yet another object of this invention to provide a stacked mixed slide transfer mechanism suitable for use in projectors that allows the movement of slides of varying thicknesses yet prevents more than one slide from leaving a slide tray at a time.

SUMMARY OF THE INVENTION

In accordance with principles of this invention a stacked mixed slide gate mechanism, suitable for use in a slide projector, that allows the projector to use slides of varying thickness is provided. The slides are located in a slide supply tray and received by a slide storage tray. The slides are "pressed" against the "front" of each tray by a suitable means. Located adjacent to the front of at least the supply tray is a gate. The gate is moveable to at least one detent position to allow thick slides as well as thin slides to leave the tray and move into the slide transfer path while preventing more than one slide from moving into that path.

In accordance with other principles of this invention, the slides are "pressed" against the "front" of each tray by a spring-pressure pad arrangement.

In accordance with further principles of this invention, the gate includes a rotatable arm having a spring loaded ball at one end. The spring loaded ball fits into various detent positions determined by the position of the arm, the arm's position being determined by the thickness of the slide to be moved into the slide transfer path.

In accordance with yet other principles of this invention, the gate is normally fixed in a position that allows a thin or normal slide to freely move into the slide transfer path while preventing a second slide from also moving into the path. When a thick slide is to be moved into the slide transfer path, the gate opens to a detent position and allows the thick slide to move into the slide transfer path. Upon the return stroke of the slide transfer mechanism, the gate is returned to its normal position.

In accordance with still further principles of this invention, a stacked slide gate mechanism of the foregoing nature is mounted at the front of the slide storage tray as well as the slide supply tray in a reversable projector. Both stacked mixed slide transfer mechanisms operate as described above. In addition, the slide transfer mechanism includes means for locking the gate at the receiving tray (either supply or storage depending upon the mode of operation) in a "wide open" position to allow the entry of slides into the receiving tray.

It will be appreciated from the foregoing brief summary of the invention that a rather uncomplicated mechanism suitable for use in slide projectors to allow the projectors to display slides of varying thicknesses is provided. The use of a tray or trays having pressure means to force the slides against the front of the trays in combination with a moveable gate results in a system that allows normal thin slides to move into a slide transfer path one-at-a-time. In addition the moveable gate allows thicker slides to also move into the slide transfer path. Because, preferably, a spring-ball and detent position mechanism is used, the gate has sufficient rigidity to prevent two slides from moving into the slide transfer path at the same time. Moreover, the same mechanism allows the gate to open to predetermined positions whereby the gate is prevented from rubbing on the photographic surface of the slides being moved.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 2 is a cross-sectional view along line 2—2 of FIG. 1;

FIGS. 3A and 3B are cross-sectional views along line 3—3 of FIG. 2 for different positions of the slide transfer mechanism; and, FIG. 4 is a cross-sectional view along line 4—4 of FIG. 2.

DESCRIPTION OF THE PREFERRED EMBODIMENT

Figure 1:
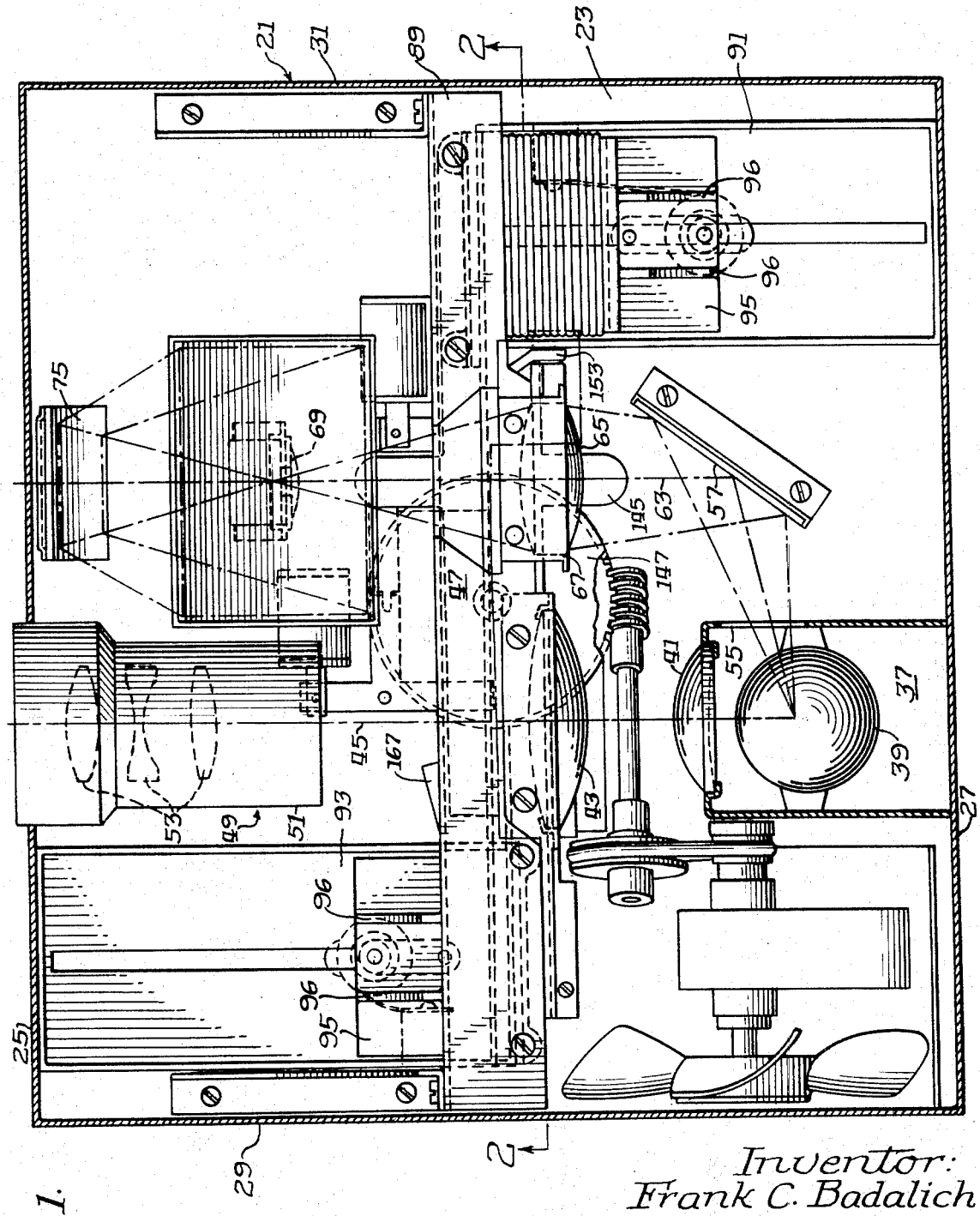
FIG. 1 is a horizontal sectional view of the casing of a slide projector wherein a preferred embodiment of the present invention is mounted.

Turning now to the drawings wherein like reference numerals designate like parts throughout the several views; FIG. 1 illustrates a slide projector 21 which comprises a substantially rectangular casing 23 having front and rear walls 25 and 27 and side walls 29 and 31. The casing 21 also includes a base 33 (FIG. 2) and a covering member or top 35. A chamber is thus defined within the casing 23.

A generally boxed shaped lamp housing 37 is attached to the rear wall 27 at a point intermediate the side walls 29 and 31. The lamp housing 37 houses a projection lamp 39. A pair of condensing lenses 41 and 43 (FIG. 1) are optically aligned with each other and with the lamp 39 along a projection axis 45, on one side of a slide track 47. A projection lens system 49 is located along the projection axis 45 on the other side of the slide track 47. The projection lens system 49 includes a barrel 51 that extends through the front wall 25. The barrel houses a plurality of lenses 53 (shown schematically by dashed lines in FIG. 1) for projecting a slide image in a conventional manner. The projection system, including it's lenses, may be of any conventional design and, accordingly, is not further described herein.

The lamp housing 37 includes an aperture 55 located in one side (the right side as viewed in FIG. 1). Light from the lamp 39 passes through the aperture 55 and impinges on a first mirror or reflecting surface 57 suitably mounted in the casing 23. Light from the lamp is reflected by the first mirror 57 along a preview station projection axis 63. The preview station projection axis 63 is parallel to the projection axis 45 as viewed in FIG. 1. A preview station condensing lens 65 held in a housing 67 is aligned along the preview station projection axis 63 on the same side of the slide track 47 as the condensing lenses 41 and 43 of the projection system.

A preview station projection lens 69 (shown in dashed line form in FIG. 1) is located on the other side of the track 47. The preview station projection lens 69 is mounted so as to project light from the lamp 39 onto a second mirror 75. The second mirror 75 is mounted at a slight angle to the vertical so as to project light from the lamp 39 onto a screen 81 (FIG. 2) held in the top wall 35 of the casing 23. Due to this arrangement, light from the light source passes through a slide image located at a preview station prior to the slide image intersecting the projecting axis, and the preview station slide image is displayed on the screen. Thus, a slide may be previewed prior to its being projected.

A generally U-shaped slide transfer mechanism frame 89 is mounted at right angles to the projection axis between the projection lens system 49 and the condensing lenses 41 and 43. The slide transfer mechanism frame 89 generally defines the slide track 47.

A slide supply magazine 91, generally in the form of rectangular open-topped box, has its rear attached to the rear wall 27 and its front supported by the slide transfer mechanism frame 89. Similarly, a slide storage magazine 93, also generally in the form of a rectangular open-topped box, has its back attached to the front wall 25 and its front supported by the slide transfer mechanism frame 89. As hereinafter described, slides move from the supply magazine 91, through preview and projection stations, to the storage magazine 93. Both the supply and the storage magazines include slide pressure pads 95. The slide pressure pads 95 are generally right-angled in cross section and include angular support ribs 96. The lower surface of the slide pressure pads rest on the bottoms of the supply and storage magazines 91 and 93. The upwardly projecting surfaces of the slide pressure pads 95 are pressed by the action of a negator spring against the last or end slide of the plurality of slides that are held in the storage and supply magazines so as to force the slides toward the slide transfer mechanism frame 89.

While the projector will operate in either a forward or a reverse direction, the normal or forward movement is from a slide supply position 115, through a slide preview position 117 and a slide projection position 119, to a slide storage position 121, or from right to left as viewed in FIG. 2.

The mechanism for moving the slides through the four positions is fully described in U. S. Patent application Ser. No. 141,618, filed concurrently herewith by Frank Badalich and entitled "Slide Projector." However, in general, the slide transfer mechanism includes a slide transfer frame 131 (FIGS. 3A and 3B). The slide transfer frame 131 includes a slotted rail 145 having a slot in its lower side. The slotted rail 145, acts in conjunction with a pin projecting upwardly from a point near the circumference of a rotatable, cylindrical plate 147 to cause the slide transfer frame 131 to move back and forth or from left to right and vice versa as viewed in FIGS. 3A and 3B. As the slide transfer frame 131 moves back and forth, it moves a first yoke between the slide supply and slide preview positions, and a second yoke between the slide projection and slide storage positions. The yokes, in turn, interact with slides in these positions to move the slides through the projector.

The foregoing brief description of one type of projector in which the invention is useful is provided so that the operation of the hereinafter described invention will be better understood, reference being made to the U. S. Patent application referred to above (Ser. No. 141,618) for a more complete description of the operation of the projector.

Turning now to a description of the invention; the invention comprises a supply gate mechanism 149 and a receiving gate mechanism 151 best illustrated in FIGS. 3A and 3B. Each gate mechanism includes a gate arm 153 that is rotatably mounted on a support plate 154 (FIG. 2) fixedly mounted in the projector beneath the respective slide supply or slide storage tray. Each gate arm projects first toward the center portion of the projector from beneath the respective tray; then upwardly along the inner side of the respective slide tray; and, finally, inwardly toward the slide transfer path. Each gate arm 153 terminates in a pad 155. Each pad 155 is located such that when the gate is closed, as hereinafter described, the inner surface 156 (FIG. 4) of the pad intersects the "second" slide in the respective tray.

A generally triangular gate control member 157 is also located beneath each tray so as to rotate about the same axis as the axes of rotation of the gate arms 153. That is, a gate control member and a gate arm are mounted for rotation about a cylindrical pivot element 159 for each tray. Moreover, the gate control elements and the gate arms are affixed to one another in any suitable manner so that they rotate together (if desired, these elements can be formed as a unitary structure). Each gate control member 157 includes a generally vertical flange 161.

An L-shaped lever arm 163 is rotatably attached to the gate control member 157 at a pivot point 165 located near the front of the respective tray. More specifically, the L-shaped lever arm has two arms 166 and 167 one of which is normally parallel to its respective tray and the other of which is normally parallel to the slide transfer path. The pivot point 165 is located in the arm 166 which is normally parallel to the respective tray, near the slide transfer path.

Each L-shaped lever arm includes an outer projection 168 at the outer tip of the arm 168 normally parallel to the tray. A coil spring 169 is mounted between the outer projection 168 of the lever arm 163 and the generally vertical flange 161 of the gate control element 157. In addition, each L-shaped lever arm includes a projection that projects toward the slide transfer path from the end of the arm 167 that is normally parallel to the slide transfer path.

Two flanges, one beneath each tray, are attached to or form part of a forward-reverse control plate 172 (FIG. 2), forming a part of the control system of the projector. That is, as described in U. S. Patent application Ser. No. 141,618, referred to above, when the control plate 172 is in one position of two positions, the projector operates in a forward mode and when it is the other position the projector operates in a reverse mode. Each flange 171 includes an upwardly projecting pin 173 that impinges on the inner surface of the same arm 166 that supports the outer projection 168. In addition, two pins 175 project upwardly from the slide transfer frame 131 so as to intersect the outer edge of the projection on the arm 167 of the L-shaped lever arm 163 that is normally parallel to the slide transfer path, as best illustrated in the right portion of FIG. 3A and the left portion of FIG. 3B.

In addition to the foregoing elements, as best seen in FIG. 2, a spring loaded ball forms a part of the gate mechanism of the invention. More specifically, a coil spring 177 is mounted in a suitable vertical aperture 179 in the gate control element 157. The lower end of the coil spring impinges on the upper surface of a ball 181. The ball 181 is moveable into one of several detent positions 183 formed in the support plates 154 mounted beneath the trays.

Turning now to a description of the operation of the invention; when the control plate 172 is in one of its two positions, one of the gates is entirely open and the other is closed to a "thin" slide position. For example, in FIG. 3A, the projector is operated in the forward mode wherein slides are moving from the slide supply tray 91 to the slide storage tray 93. In this mode, the gate 151 at the front of the slide storage tray 93 is entirely open and the gate 149 at the front of the slide supply tray 91 is closed to a thin slide position. The opposite mode is illustrated in FIG. 3B.

The mode of operation and the selection of open and closed gates is caused by the pins 173 mounted on the flanges 171 attached to the control plate. These pins 173 move against their associated arms 166 of the L-shaped lever arm 163. This movement causes one of these arms to rotate the associated gate arm 153 against the action of the coil spring 169 into the open position. The other gate arm is closed by the action of the associated pin 175 striking the other arm 167 of the L-shaped lever arm 163. As can be seen from either FIGS. 3A or 3B, in the "closed" position, a "thin" or normal slide can pass between the inner edge of the pad 155 of the associated gate arm 153 and the mechanism of the slide transfer frame but the second or "next" slide cannot pass. Contrawise, in the "open" position the gate arm is in position such that the entrance of both "thin" and "thick" slides into the receiving tray is allowed. This is the normal situation of operation, i.e., one gate arm is closed and the other is open. Thus, the gate arm at the supplying tray prevents a second slide from entering into the slide transfer path and jamming the mechanism of the invention while the gate arm of the receiving tray allows all thickness slides to enter.

When the abnormal situation occurs wherein one or more of the slides is thick, it will be appreciated that if the gate arms were to remain fixed in the "thin" slide position, the thick slides would not be able to move into the slide transfer path of the projector. However, because the gate arms are moveable upon the application of a pressure sufficient to overcome the force of the spring loaded ball mechanism, the invention overcomes this problem. More specifically, when a thick slide impinges on the pad 155 of the arms 153 with sufficient force, such as when the slide is being moved by the slide transfer mechanism, the gate arm 153 rotates about the pivot 159. This action also causes rotation of the gate control element 157 through the coupling coil spring 169. When such rotation occurs, the detent ball 181 moves from its normal location in the outer or normal detent position 183 to a detent position closer to the front of the tray. It will be appreciated that due to the ball-spring detent mechanism, once the detent ball starts to enter a detent aperture, the gate arm continues to rotate away from the slide transfer path until the ball "falls into" the new detent position. This new position is such that the thick slide passes without the pad sliding over the image portion of the slide and scratching that region. On return movement of the slide transfer frame 131 the pin 175 impinges on the edge of the L-shaped lever arm 167 to cause the lever arm to rotate back to its normal position. This rotation closes the gate arm 153 thus preventing the gate arm from remaining open after a thick slide has been transferred.

It will be appreciated from the foregoing description that the invention provides an uncomplicated mechanism for preventing more than one side from leaving a slide tray and moving into the slide transfer path at the same time. However, the invention does not prevent a thick slide from entering the slide transfer path. Rather, the invention allows the gate arm to open sufficiently to allow the thick slide to move into the slide transfer path. In fact, the gate arm opens wide enough to prevent the pad from rubbing on the slide's image and, thereby, scratching the slide.

It will be appreciated by those skilled in the art and others from the foregoing description that the gate arms at both trays operate in the same manner. Which gate is open and which gate is closed merely depends upon the mode of operation of the projector, i.e., forward or reverse. It will also be appreciated however, that if the projector only operates in the forward mode that the gate located at the front of the receiving tray can be eliminated.

It also will be appreciated by those skilled in the art and others that while a preferred embodiment of the invention has been illustrated and described, various changes can be made therein without departing from the spirit and scope of the invention. Hence, the invention can be practiced otherwise than as specifically described herein.

The embodiments of the invention in which an exclusive property of privilege is claimed are defined as follows:

1. A stacked mixed slide gate mechanism suitable for use in a slide projector wherein slides are moved along a slide transfer path from a first slide tray located on one side of a projection axis to a second slide tray located on the other side of a projection axis by a slide moving mechanism and vice versa, depending upon the mode of operation, said stacked mixed slide gate mechanism being adapted to prevent the entry of more than one slide into the slide transfer path from either slide tray while allowing slides of varying thicknesses to enter the slide transfer path and pass into the other tray, said stacked mixed slide gate mechanism comprising:

a first gate arm mounted in said slide projector in front of said first slide tray so as to be associated there-with, and between said first slide tray and said slide transfer path;

a second gate arm mounted in said slide projector in front of said second slide tray so as to be associated there-with, and between said second slide tray and said slide transfer path; and, a gate control means coupled to said first and second gate arms to hold one of said gate arms in a first pre-determined position that allows a single slide of predetermined thickness to leave its associated slide tray and move into said slide transfer path while preventing further slides from leaving said associated slide tray, and to hold the other of said gate arms in a second predetermined position that allows a slide of any thickness to enter its associated slide tray.

2. A stacked mixed slide gate mechanism as claimed in claim 1 wherein said gate control means allows said one of said gate arms to move from said first predetermined position when a slide that is thicker than said predetermined thickness is being moved from its associated slide tray into said slide transfer path.

3. A stacked mixed slide gate mechanism as claimed in claim 2 including first and second lever arms, said first lever arm being associated with said first gate arm and said second lever arm being associated with said second gate arm, the lever arm associated with said one of said gate arms coating with said gate control means so as to return said one of said gate arms to said first predetermined position after said one of said gate arms has been moved from said first predetermined position to allow the passage of a thick slide from its associated slide tray into said slide transfer path.

4. A stacked mixed slide gate mechanism as claimed in claim 3 wherein the lever arm associated with the other of said gate arms coacts with said gate control means so as to move said other of said gate arms from said first predetermined position to said second predetermined position to allow the entry of slides from said slide transfer path into its associated slide tray.

5. A stacked mixed slide gate mechanism as claimed in claim 4 wherein said lever arms are L-shaped and wherein one of said L-shaped arms is parallel to said slide transfer path and the other is parallel to its associated slide tray when its associated gate arm is in said first predetermined position.

6. A stacked mixed slide gate mechanism as claimed in claim 5 wherein said gate control means includes first and second detent mechanisms, said first detent mechanism being associated with said first gate arm and said second detent mechanism being associated with said second gate arm, said detent mechanisms adapted to lock said gate arms in more than one position, said positions including said first and second predetermined positions.

7. A stacked mixed slide gate mechanism as claimed in claim 6 wherein each of said detent mechanisms comprises a spring-ball arrangement and a plurality of apertures formed in a plate, said plate being fixedly mounted in said slide projector.

8. A stacked mixed slide gate mechanism as claimed in claim 7 including means mounted in said slide projector for movement with the slide transfer mechanism of said slide projector that returns said one of said gate arms to said first predetermined position by impinging on its associated lever arm after said gate arm has been moved from said first predetermined position by a slide that is thicker than said predetermined thickness moving from its associated slide tray into said slide transfer path.

9. A stacked mixed slide gate mechanism as claimed in claim 8 wherein said slide projector includes means that causes said lever arms to coact with said gate control means and move said gate arms from said first predetermined position to said second predetermined position to allow slides from said slide transfer path to enter their associated slide trays.

10. A stacked mixed slide gate mechanism as claimed in claim 3 wherein said lever arms are L-shaped and wherein one of said L-shaped arms is parallel to said slide transfer path and the other is parallel to its associated slide tray when its associated gate arm is in said first predetermined position.

11. A stacked mixed slide gate mechanism as claimed in claim 10 including means mounted in said slide projector for movement with the slide transfer mechanism of said slide projector that returns said one of said gate arms to said first predetermined position by impinging on its associated lever arm after said gate arm has been moved from said first predetermined position by a slide that is thicker than said predetermined thickness moving from its associated slide tray into said slide transfer path.

12. A stacked mixed slide gate mechanism as claimed in claim 1 wherein said gate control means includes first and second detent mechanisms, said first detent mechanism being associated with said first gate arm and said second detent mechanism being associated with said second gate arm, said detent mechanisms adapted to lock said gate arms in more than one position, said positions including said first and second predetermined positions.

\* \* \* \* \*